Nov. 13, 1956 P. S. MORGAN 2,770,155
BALL AND HELICAL RACE FOR MECHANICAL MOVEMENTS
Filed July 26, 1952 3 Sheets-Sheet 3
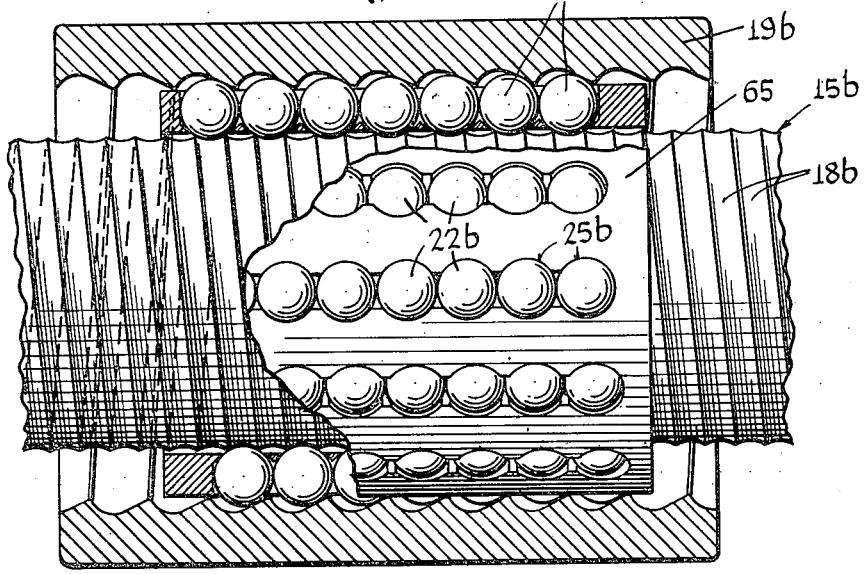
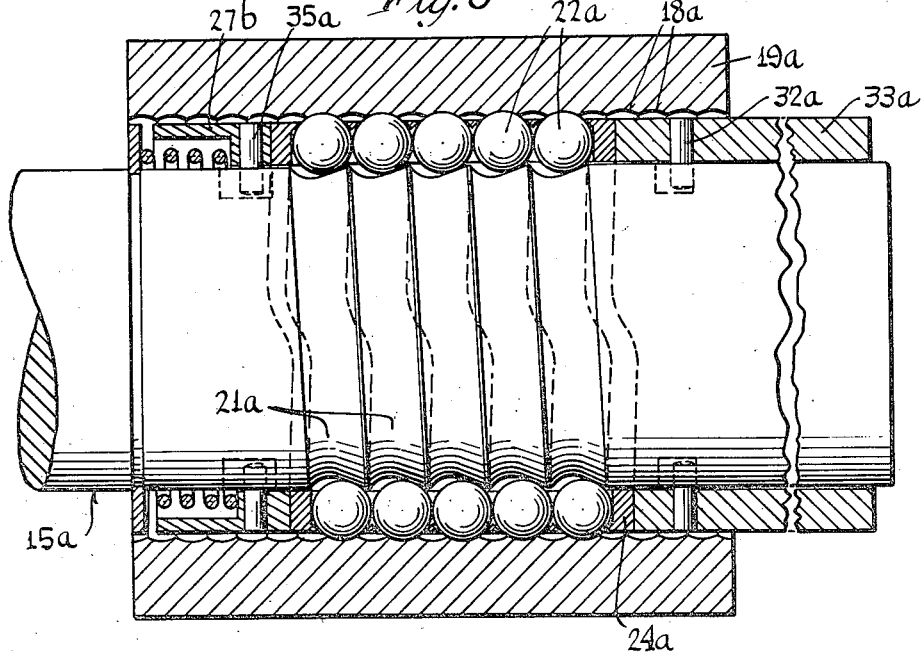
INVENTOR
Porter S. Morgan
BY Johnson and Kline
ATTORNEYS

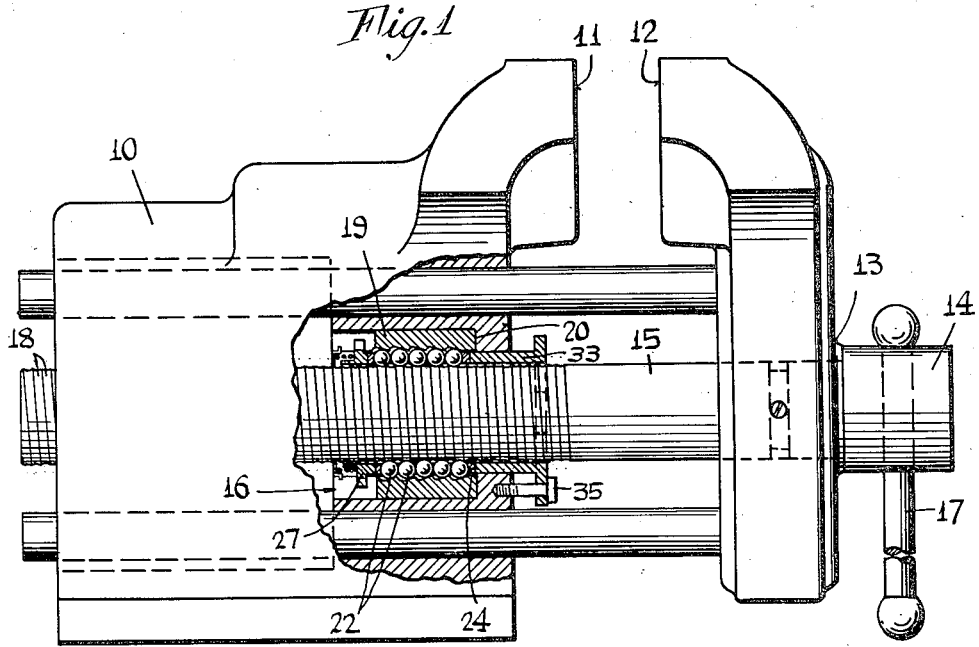

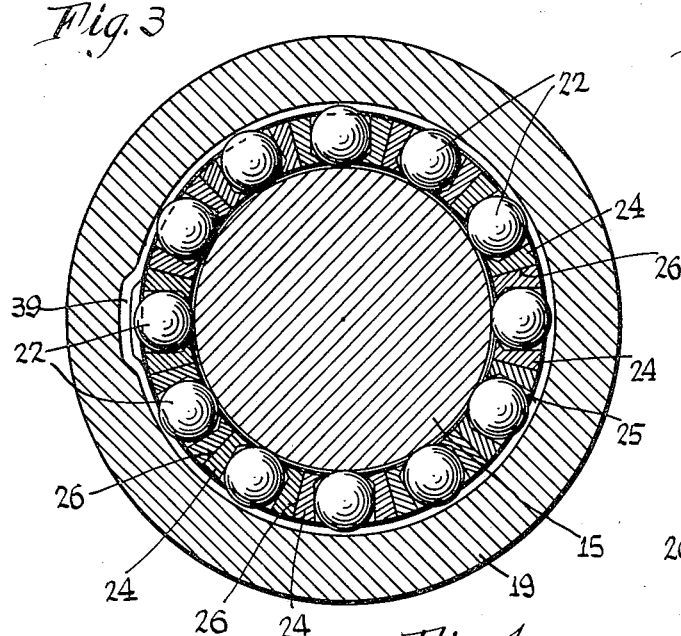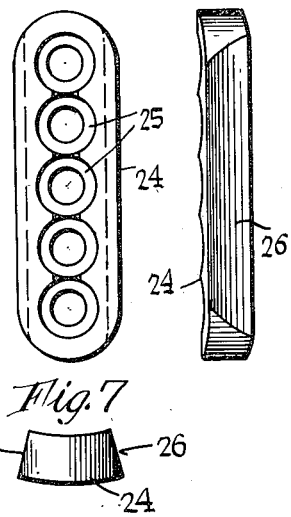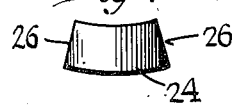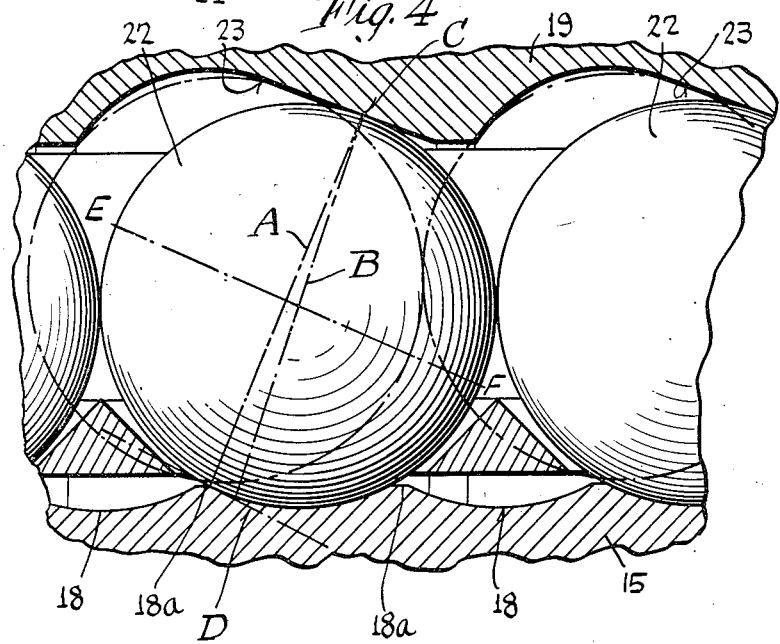

United States Patent Office 2,770,155
Patented Nov. 13, 1956

2,770,155
BALL AND HELICAL RACE FOR MECHANICAL MOVEMENTS

Porter S. Morgan, Westport, Conn., assignor to Morgan Development Laboratories, Inc., Westport, Conn., a corporation of Delaware Application July 26, 1952, Serial No. 301,043

22 Claims. (Cl. 81—36)

This invention relates to devices for producing relative axial movement between a cylindrical member and an encircling member having a cylindrical bore as a result of the rotational displacement of one member relative to the other on the same axis.

Heretofore, the most common mechanical means for accomplishing this result was the screw and nut arrangement in which both the cylindrical member (the screw) and the encircling member (the nut) were provided with threads engaging each other.

In my copending application Serial No. 293,219, filed June 12, 1952, now Patent No. 2,715,925, dated August 23, 1955, I have disclosed that by providing in one only of the relatively movable members a helically disposed race with an inclined face of proper inclination and positioning, a series of balls encircling the rod and lying in said race will wedge between the face of the race and the surface of a plain member and grip the same, with the result that when the member having the race and the plain member are given relative rotatary movement the balls follow the helix of the race and while maintaining their gripping relation will cause one of the members to move axially relative to the other and in accordance with the lead of the helical race.

I have further discovered that the wedging race may be on either the cylindrical member or the encircling member, and that the relative movement may be effected by rotation of either member while the other is held against rotation, or that both members may be rotated provided there is relative rotational displacement between them.

The helical race has such depth that axial movement applied directly to the axially movable member in the same direction as the race-imparted movement will free the balls from gripping action and such movement will be unhindered by the balls. As soon as such axial movement ceases the balls are immediately returned to gripping position and thereby not only prevent retrograde movement of the axially movable member but also cause the axial movement of the member to be resumed upon the turning of the rotatable member without lost motion.

The load to be sustained or moved is transmitted from one member to the other by the balls between them and this load may be distributed over as large a number of balls as is necessary to support the load without crushing the balls.

I have discovered, however, that substantially greater loads may be sustained or moved without increasing the number of balls being used by providing on the member which does not have the wedge race, physical alterations in the form of inclined surfaces helically arranged on the member in a helix whose pitch corresponds to that of the helix along which the races extend. By this arrangement, the angle of the inclined faces of the race to the direction of the load can be substantially greater, thereby substantially decreasing the compressional force on the balls and reducing the danger of the balls being crushed. This is possible because the included angle between the inclined faces of the race and the inclined surfaces on the other member may be kept small, thereby increasing the wedging effect of the balls between the two surfaces.

It is advantageous to provide the helical inclined surfaces on the one member by rolling or cutting a concave groove therein having the same pitch as the races, the radius of curvature of the concave groove being substantially the radius of the balls. In this way, instead of having point contact with the groove, the engagement of the ball is distributed over a wider area, thus further tending to avoid crushing of the balls.

By making the grooves shallow and the diverging portion of the races deep, the balls may move into this deeper portion of the races and out of the concave groove when axial movement in work-performing direction is applied manually or otherwise to the axially moving member without necessarily requiring rotation of either member. This has the advantage of permitting the load sustaining or moving member to be quickly brought to working position.

Thus, when the device of the present invention is incorporated in a bench-vise for instance, the movable rod may be quickly manually pushed longitudinally by hand until it engages the work (during which movement the balls are out of gripping position) and then when the advancing movement of the rod is stopped the balls immediately move to gripping position (either by gravity or otherwise) into the helical groove of the rod and rotation of the rod then causes the rod to advance until its end engages the work with the desired pressure.

The pressure may be relieved to free the work in the example given by reverse rotation of the rod, or the gripping action of the balls on the rod may be relieved by moving the balls axially of the rod in the direction of the forward advance of the rod.

To facilitate this releasing of the balls by their independent relative movement, not only in the example given above but in other situations, it is preferable that the balls be carried in a retainer so that their movements can be controlled by movement of the retainer axially relative to either of the members. This retainer may be spring-urged in one direction so as to constantly urge the balls into gripping position and may be moved by application of external force, such as a manually applied force, against said spring action to release the balls.

In the broader aspects of this invention, the helical race may be in the form of a groove and may include one or more turns with guide means being provided to interconnect the terminals of the groove so that when the balls reach one terminal they may be propelled in the reverse direction to the other terminal, and the interconnecting guide may be so arranged that the balls are out of wedging contact with the relatively movable members during their transfer travel.

In its simplest form, however, the helical section of the race may extend for only a fraction of a turn with a ball-freeing return section interconnecting the ends of the helical section. In fact, when desired, the race may have several helical sections each connected by a return ball-freeing section forming an endless race around the member. While each ball is returning to the other end of the helix, the other balls are maintaining their gripping relation between the members to advance the one relative to the other.

Where the load to be moved or the force to be applied by the axially movable member is excessive for a single annular series of balls, a plurality of such series of balls and races may be used in tandem, thus reducing the compressional strains on each individual ball.

When a continuous single turn race is used as distinguished from a continuous plural turn race, it is preferable that each ball be contained in a retainer so that its gripping action may be individually controlled and so that its movement in the return portion of the race may be effected without the balls necessarily engaging the race. When there are a plurality of annularly endless races in tandem the return portions of the races are preferably aligned on a line parallel to the axis of the member, and in this situation each row of axially aligned balls is preferably carried in one common retainer so that the balls move in unison.

The retainers for the balls, whether the latter are in a single series or in a plurality of tandem series, may be of such width as to evenly space the balls around the annular race.

The ball-guiding race may be provided on the cylindrical member or the sleeve encircling it depending on the circumstances. Usually it is preferable to have the race on the shorter of the two members.

Depending on the pitch of the helical races, the helical concave groove in the other member may be of single or multiple lead, the latter being preferable since it permits a larger number of annular series of balls to be used within a given space and provides more stopping places for the balls on the helically grooved member when axial movement is produced without relative rotation of the members.

Other features and advantages will hereinafter appear.

In the accompanying drawings:

Figure 1 is a side view of a bench-vise partly in section and partly broken away, showing the present invention applied thereto.

Fig. 2 is an enlarged view of the device shown in Fig. 1, in which the relatively fixed member is provided with the helical races and the axial and rotatably movable member has the physical alterations in the form of a shallow helical groove.

Fig. 3 is a transverse sectional view taken on the line 3—3 of Fig. 2.

Fig. 4 is a greatly enlarged view showing the relationship between the balls, the inclined races and the grooved surface against which the balls are clamped, and also showing in section the ball-controlling bars.

Fig. 5 is a detail view of one of the ball-controlling bars used in the device illustrated in Figs. 1, 2 and 3.

Fig. 6 is a side view of the bar shown in Fig. 5.

Fig. 7 is an end view of the bar shown in Fig. 5.

Fig. 8 is a view partly in section showing another embodiment of the present invention.

Fig. 9 is a view similar to Fig. 2 but showing the helical groove in the sleeve and the endless races in the shaft.

The device of the present invention, while illustrated herein as applied to a bench-vise as exemplary of one application thereof, has utility for load moving and/or sustaining, motion imparting and/or restricting, or other work-performing functions. It is particularly advantageous in the following situations: where heavy loads are to be moved or controlled and an important saving results from avoiding the necessity of providing screw threads on one of the relatively movable members; where the desired rate of axial advance of one member relative to the other for each revolution of the driver would require, due to the low pitch, threads so fine that they could not sustain the load or would be impractical to produce commercially; and/or where a rapid free axial movement of a force-applying member toward the work is desired followed by work-performing force having mechanical advantage.

As in the bench-vise illustration of the present invention, the axially movable member may be in the form of a cylindrical rod with physical alterations in the form of shallow helical grooves while the relatively stationary member is in the form of a sleeve or nut which is held while the rod is either pushed toward the work longitudinally or is rotated to advance toward the work as would a screw. Or, the rod may have the helical grooves and may be held relatively stationary while the sleeve or nut is rotated to produce the relative axial movement between the members.

In some situations the arrangement shown in the bench-vise embodiment of the invention may be conveniently reversed and the sleeve or nut may have a helical grooved bore while the rod or other cylindrical member within it may be provided on its external surface with hedically disposed races. In this situation also either the internal member or the external member, the rod or sleeve for instance, may be rotated to produce the relative axial movement between the members, and either member may be the one which moves while the other is stationary or they may both move axially in opposite directions relative to some other member which is relatively fixed depending on the functions to be performed.

In Fig. 1, I have illustrated a bench-vise having a body 10 carrying a fixed jaw 11 and a movable jaw 12 having a boss 13 to be engaged by a collar 14 on the end of a draw rod 15 which extends through a bore 16 in the body 10 and has on its outer end a handle 17 by means of which the rod may be rotated or moved axially without rotation as will hereinafter appear. In accordance with the present invention, the rod 15 has a shallow helical groove 18 on its surface.

A sleeve 19 has a press fit within the bore 16 and one end of the sleeve engages a shoulder 20 in the bore to resist axial movement of the sleeve toward the right as shown in Fig. 1.

The sleeve 19 is, according to the present invention, provided with a series of helically disposed races 21 spaced a predetermined distance from the grooved surface of the rod 15. Lying on the races 21 are a series of balls 22 of such diameter as to be simultaneously engageable with the grooves 18 and the faces 23 of the races. As is more clearly illustrated in Fig. 22, the faces 23 of the races are inclined toward the axis of the sleeve 19 in the direction of the shoulder 20 and are so spaced from the surface of the faces of the grooves 18 that the balls may be wedged between the inclined faces 23 and the concave surfaces of the rod, or when urged in the opposite direction may be freed from wedging relation between the faces 23 and the surface of the rod.

The extent of inclination of the faces 23 may be varied depending upon the coefficient of friction of the materials employed. I have found that when the parts are formed of steel, if the faces 23 form an angle of 20 degrees with the axis of the rod, adequate wedging action without excessive crushing force on the balls is produced so that retrograde movement of the rod, i. e. movement of the rod 15 to the right in the example given, is prevented by gripping action, between the approximately opposite surface of the balls and the surfaces of the rod and faces 23 of the races.

In my above-mentioned patent, the balls are wedged between helically disposed race faces and a plain cylindrical surface parallel with the axis of the members and without physical alterations. Considering the situation where the parts are all made of steel, the angle between the inclined surfaces of the helical races and the surface of the cylindrical member when in the order of 7½ degrees is sufficient to cause the balls to wedge themselves between the opposed surfaces. This angle is relatively small and as a result the compressive forces on the balls are large when the balls are under load.

In order to permit greater loads to be safely transmitted by the balls without increasing the diameter of the balls or their number, I have found that the member not having the ball races 21 referred to above may be provided with inclined helical surfaces facing the inclined races in the other member. In this way, the angle between the inclined races and the inclined helical surfaces may be substantially reduced while permitting the angle between the inclined races on the one member and the axis of the other member to be so large that the compressive force on the balls under load is substantially reduced. By the provsision of such inclined helical surfaces less mechanical advantage is required to produce the wedging action, and accordingly the ratio of compressive forces in the balls to the axial load to be transmitted is substantially reduced.

This companion inclined surface on the one member may be most conveniently had by rolling or otherwise forming concave grooves, the grooves 18 in the form shown in Figs. 1 to 4, having radii substantially the same as that of the ball. A tangent through the center of the arc of contact, or the point of contact, of the ball with the concave groove on one member and the tangent of the point of contact of the ball with the inclined helically disposed race face on the other members make a very small angle, thus substantially increasing the wedging action of the balls. The concave groove has the same pitch as the helical races so that the angular relation between the inclined faces 23 and the groove may be maintained constant as one member is rotated relative to the other.

In the form of the invention shown in Figs. 1 to 4, in order that they may be relatively large, the balls of each aligned set are spaced so that they will engage alternate convolutions of the helical grooves 18. There are, therefore, double the number of stopping places on the rod 15 for the balls when the rod is slid through the sleeve 19 without rotation.

The balls 22 are held in spaced relation around the rod 15 by suitable retaining means which, in the construction of the vise shown in Fig. 1, comprises a series of bars or sticks 24, one of which is shown in Figs. 5 to 7. Each bar 24 has sockets 25 to receive the balls. The bars 24 are arranged parallel with the axis of the rod 15 and have their adjacent edges 26 abutting as shown in Fig. 3, and thus maintain the balls equi-spaced around the rod.

The bars 24 are engaged simultaneously at their left-hand end, as shown in Figs. 1 and 2, by a presser plate 27 engaged by an expansion spring 28 backed by a snap ring 29 having ears 30 fitting in an annular groove in the end of the sleeve 19, the latter having diametrically opposite slots 31 within which ears 32 on the presser plate ride to prevent rotation of the presser plate. The engagement of the presser plate 27 with the ends of the bars 24 causes the balls to be wedged between the race faces 23 and the surface of the grooves 18. The opposite ends of the ball-controlling rods 24 are engaged by a collar 33 slidably mounted on the rod 15 and having a finger piece 34. The collar is prevented from rotating and its outward movement is limited by an abutment which may be in the form of a screw 35 riding in a hole 36. When the finger piece 34 is pushed to the left as shown, it moves all the ball-controlling bars 24 to the left and positions the balls, as shown in dot and dash lines Fig. 4, in the widely diverging portions of the race faces 23 so that the rod 15 may be given retrograde or work-disengaging axial movement without the portions 18a between the grooves 18 interfering with the movement of the balls from one groove to another.

According to the present invention, the relative axial movement between the rod and its encircling sleeve is produced by causing the races 21 to be helically disposed so that as one or the other of the members is rotated while the balls 22 are in wedging position the balls follow a helical path advancing in work-performing direction and carrying the other member with them. In some embodiments of this invention, for instance those referred to below, the balls may continuously advance with the axially movable member. However, in the embodiment of the invention shown in Figs. 1 to 3, the races 21 do not form a continuous helix but are arranged as endless races or tracks including a helical portion 37 and a return or reverse portion 38 connecting the beginning and end of the helical portion. By this arrangement, while some of the balls are advancing axially with the rod 15 when on the helical portion 37 of the race, others of the annular series of balls are returning from the end of the helical race to the beginning thereof in the reverse portion 38.

To permit this return of the balls from the end to the beginning of the helical race 37, the race in the reverse portion 38 is made deeper as by an undercut or clearance 39. In other words, the undercut portion 39 of the reverse portion 38 of the race is sufficiently spaced from the surface of the rod 15 that during the travel of the balls through the reverse portion the wedging or gripping action between the sleeve 19, the balls 22 and the rod 15 is relieved, and the balls may freely return from the end of the groove to the beginning thereof. To facilitate the movement of the balls through the reverse portion 38 of the race, the presser plate 27 and the manual release collar 33 have their working surfaces 27a and 33a, shown in broken lines in Fig. 2, shaped like the contour of the races. Hence, as a row of balls reaches the reverse portion 38 of the race, the presser plate urges the ball-controlling bar 24 to the right as shown in Fig. 1, and the extent of such movement is limited by the contour of the collar 33, and the balls of the returning row are freed from any wedging engagement with the return portion 38 of the race and are guided through the enlarged portion thereof by the camming action of the presser plate 27 and collar 33.

Since the balls are wedged between the inclined surfaces 23 of the races 21 and the surface of the grooves 18, rotation of the rod 15, in the form of the invention shown in Fig. 1, will cause the rod to immediately advance in work-performing direction and the rate of advancement depends upon the pitch of the helical portions 37. In so doing, the balls, while maintaining their wedging relation, have epicyclic movement along a helical path in both the grooves 18 and the races 21. The maximum steepness of the pitch depends upon the amount of work to be performed, the available power and the strength of materials. The pitch may be small since the grooves on the rod are shallow and may be close together and single or multiple lead, as desired.

The present invention is based on my discovery that a series of balls wedged between the inclined surface of a helically disposed race on one member and the threadless surface of another member so as to prevent relative axial movement of the members in one direction, when caused to rotate by the rotation of either member will follow the helix of the race while maintaining rolling line wedging engagement with the inclined and unthreaded surfaces, with the result that one member will be held against axial movement and the other will be axially advanced.

This principle holds true even though, as in the present form of my invention, one side of each ball is in engagement with the shallow groove 18.

By referring to Fig. 4, it will be seen that the rolling line contact A of the ball is only slightly offset from the equator B of the ball due to the very slight angular relation between the surface C of the race and the tangent D of the ball. Thus a ball in traveling around the rod 15 rotates approximately on the axis E—F and is caused to advance by rolling up the inclined helical track while still maintaining its wedging relation between the surfaces C—D, causing relative axial movement between the rod 15 and the sleeve 19.

One of the advantages of the arrangement shown in Fig. 2, in which the race is endless and has a return portion, is that when the ball is returning from the end to the beginning of the helical race it is free to shift its position. Hence, when it reengages the inclined face of the race the chances are that the rolling line of contact on the ball will be different from what it was in the previous cycle. Thus, there are presented an infinite number of lines of contact and therefore the wear on the balls will be distributed.

In my above-mentioned patent, I have shown and described the various ways in which the device of my invention may be utilized to produce different conversions of power and motion. The same variety may be had with the form of my invention herein illustrated in which the one member instead of being smooth has shallow helical grooves. Suffice it to mention here these various arrangements.

Considering the device illustrated in Fig. 2 as a mechanical movement apart from the vise shown in Fig. 1, in which the rod 15 is turned and travels while the sleeve 19 is fixed stationary, the arrangement may be reversed and the rod 15 could be stationary and held against rotation while the sleeve rotates and travels. Or, the sleeve could be made to rotate without travelling while the rod is held against rotation but is caused to travel axially. Again, the sleeve may be held against rotating but is free to travel axially while the rod is held against travel but is free to rotate. Besides, instead of one member being stationary and the other travelling, or one member rotating and the other fixed, the members may move or travel in opposite directions or in the same directions but at different speeds so long as there is relative movement (axially or arcuately) between them.

In each of the above examples, the arrangement of the inclined races and the helical track (groove as shown) may be reversed and the track may be carried by the sleeve while the inclined race is carried by the rod. This is illustrated in Fig. 9 in which the rod 15a is provided with endless helically disposed races 21a like those in Fig. 2, while the sleeve 19a has the helical groove 18a. The balls 22a are located in the space between the groove 18a and the race 21a and are controlled by bars 24a like the bars 24 in the form shown in Fig. 2. The presser plate 27b is spring-pressed and splined to the rod 15a by pins 35a while the collar 33a is splined to the rod 15a by pins 32a.

As in the form shown in Fig. 2, relative rotation between the rod 15a and the sleeve 19a causes the one to advance axially relative to the other; axial movement of one relative to the other in work-performing direction may be effected without relative rotation between the members; and retrograde axial movement may be effected by releasing the wedging action of the balls by operation of the releasing collar 33a.

According to the present invention in its broader aspects the inclined races on one member for the balls may be in the form of a continuous helix like the helical track in the other member. As shown in Fig. 8, the balls 22b may be carried in sockets 25b, the centers of which are located on a helical line in a sleeve 65 which thereby maintains the balls in spaced relation. As relative rotary movement is produced between the sleeve 19b and the rod 15b, the balls roll up the helical inclined faces which may, as shown, be formed by grooving the surface of the sleeve, and thus advance the rod 15b and sleeve 19b axially relatively. Since the balls have an epicyclic movement progressing along the helical path of the helical track 18b, the rotation of the ball-carrying sleeve 65 will also cause it to advance axially and will work its way in and out of the race-carrying sleeve during the operation of the device, but this is not objectionable in many cases especially where the relative axial movement to be obtained between the rod and the sleeve is not great.

In the form of the invention shown in Fig. 8, the pitch of the helically disposed race is substantially greater than that shown in Fig. 2. In this situation it is preferable to provide the rod 15b with two helical grooves 18b paralleling each other as in a double lead screw, and these provide double the number of stopping places on the rod 15b for the balls when the rod is slid through the sleeve 19b without rotation.

The ball-carrying sleeve 65 may be urged to the right as shown in Fig. 8 in any suitable manner to cause the balls to wedge between the inclined surfaces of the races and the helical groove 18b. In many situations no mechanical means need be provided for this purpose. For instance, when the device is used so that the rod 15b is vertical, the weight of the sleeve 65 and the balls which it carries is sufficient to produce the wedging action. In other situations with the load applied to the rod 15b on the right end, as shown in Fig. 8, and absorbed by a fixed support against which the sleeve 65 bears, the friction between the balls and the surfaces engaged will itself be sufficient to cause the balls to assume a wedging position between the inclined surfaces and the cylindrical surface.

Variations and modifications may be made within the scope of the claims and portions of the improvements may be used without others.

I claim:

1. A device comprising a first member and a second member, one of said members being a cylinder and the other being a sleeve surrounding the cylinder, the first member only having on its surface facing the surface of the second member a helically disposed race having a face portion which inclines away from the axis of the second member and is spaced therefrom, the second member having on its surface facing said race a helical track, a series of spaced balls between the members and riding in said race in the space between the face of the race and the surface of the track on the second member, the inclination of the face of the race and the position thereof relative to the surface of said helical track being such that the balls wedge between said race face and the track surface of the second member in the absence of relative rotation between the members and prevent axial movement between the members in one direction and cause relative axial movement between the members in the other direction as the wedged balls travel in the helically disposed race and track in response to relative rotation between the members.

2. The invention as defined in claim 1 in which there is means for releasing the balls from wedging position.

3. A device comprising a first member and a second member, one of said members being a cylinder and the other being a sleeve surrounding the cylinder, the first member only having on its surface facing the surface of the second member a helically disposed race having a face portion which inclines at an angle of approximately 20° away from the axis of the second member and is spaced therefrom, the second member having on its surface facing said race a helical track having a surface effectively substantially parallel to the face of the race, a series of spaced balls between the members and riding in said race in the space between the face of the race on the first member and the surface of the track on the second member, the inclination of the face of the race and the surface of the track being such that the balls wedge between said race face and the track and prevent axial movement between the members in one direction in the absence of relative rotation between the members and cause relative axial movement between the members in the other direction as the wedged balls travel in the helically disposed race and track in response to relative rotation between the members.

4. A device comprising a first member and a second member, one of said members being a cylinder and the other being a sleeve surrounding the cylinder, the first member only having on its surface facing the surface of the second member a helically disposed race having a face portion which inclines away from the axis of the second member and is spaced therefrom, the second member having on its surface facing said race a helical track, a series of spaced balls between the members and riding on said race in the space between the face thereof and the track of the second member, the inclination of the face of the race and track and the positions thereof being such that the balls wedge between said race face and the track and prevent axial movement between the members in one direction in the absence of relative rotation between the members and cause relative axial movement between the members in the other or work-performing direction as the wedged balls travel on the helically disposed race and track in response to relative rotation between the members, a portion of the face of the race which inclines away from the track being sufficiently spaced from the latter to free the balls from the track and permit relative axial movement between the second member and the first member in work-performing direction without necessarily rotating the members relative to each other.

5. The invention as defined in claim 4 in which there are means for releasing the balls from said wedging action to free the members for retrograde relative movement.

6. A device comprising a member having a cylindrical bore, a cylindrical member fitting within said bore, the bored member having on its surface facing the cylindrical member a helically disposed race, the face of which is inclined away from the axis of the cylindrical member and spaced therefrom, the cylindrical member having on its surface facing said race a helical track, a series of spaced balls encircling the cylindrical member and riding on said race in the space between the face thereof and the helical track of the cylindrical member, the inclination of the face of the race and track and the positions thereof being such that the balls wedge between said race face and the track and prevent axial movement between the members in one direction in the absence of relative rotation between the members and cause relative axial movement between the members in the other or work-performing direction as the wedged balls travel in the helically disposed race in response to relative rotation between the members, a portion of the face of the race which inclines away from the track being sufficiently spaced from the latter to free the balls from the track and permit relative axial movement between the cylindrical member and the bored member in work-performing direction without necessarily rotating the members relative to each other.

7. A device comprising a member having a cylindrical bore, a cylindrical member fitting within said bore, the cylindrical member having on its surface facing the bored member a helically disposed race, the face of which is inclined away from the axis of the bored member and spaced therefrom, the bored member having on its surface facing said race a helical track, a series of spaced balls encircling the cylindrical member and riding on said race in the space between the face thereof and the helical track of the bored member, the inclination of the face of the race and track and the positions thereof being such that the balls wedge between said race face and the track and prevent axial movement between the members in one direction in the absence of relative rotation between the members and cause relative axial movement between the members in the other or work-performing direction as the wedged balls travel in the helically disposed race in response to relative rotation between the members, a portion of the face of the race which inclines away from the track being sufficiently spaced from the latter to free the balls from the track and permit relative axial movement between the cylindrical member and the bored member in work-performing direction without necessarily rotating the members relative to each other.

8. A device comprising a first member and a second member, one member having a cylindrical bore, the other member being cylindrical and fitting within said bore, the first member only having on its surface a plurality of endless races each including a helical portion of less than one turn and a reverse portion connecting the beginning and end of the helical portion, the face of each race inclining away from the axis of the second member and spaced therefrom, the second member having on its surface facing said race a helical track, a plurality of endless series of spaced balls between the members, each series riding in one of said races in the space between the face thereof and the helical track of the second member, the inclination of the face of the race and track and the positions thereof being such that the balls wedge between said race face and the track and prevent axial movement between the members in one direction in the absence of relative rotation between the members and cause relative axial movement between the members in the other or work-performing direction as the wedged balls travel in the helically disposed race in response to relative rotation between the members, a portion of the face of the race which inclines away from the track being sufficiently spaced from the latter to free the balls from the track and permit relative axial movement between the members in work-performing direction without necessarily rotating the members relative to each other, and means for releasing the balls from said wedging action when traveling through said reverse portion of the race to the beginning of the helical portion.

9. A device comprising a first member and a second member, one member having a cylindrical bore, the other member being cylindrical and fitting within said bore, the first member only having on its surface a plurality of endless races each including a helical portion of less than one turn and a reverse portion connecting the beginning and end of the helical portion, the face of which is inclined away from the second member and spaced therefrom, the second member having on its surface facing said race a helical track, a plurality of endless series of spaced balls between the members, each series riding in one of said races in the space between the face thereof and the helical track of the second member, the inclination of the face of the race and track and the positions thereof being such that the balls wedge between said race face and the track and prevent axial movement between the members in one direction in the absence of relative rotation between the members and cause relative axial movement between the members in the other or work-performing direction as the wedged balls travel in the helically disposed race in response to relative movement between the members, a portion of the face of the race which inclines away from the track being sufficiently spaced from the latter to free the balls from the track and permit relative axial movement between the members in work-performing direction without necessarily rotating the members relative to each other, and the reverse portion of the race having its face spaced from the surface of the track sufficient to release the ball located therein from its wedging action for free return to the beginning of the helical portion.

10. The invention as defined in claim 9 in which there are means for causing the balls to return to the beginning of said helical portion through said reverse portion.

11. The invention as defined in claim 9 in which the balls of the several series are in alignment parallel to the axis of the members and the reverse portion of the races are likewise aligned, and in which there are means common to the aligned balls for causing them to simultaneously return to the beginnings of said helical portions through said aligned reverse portions.

12. The invention as defined in claim 9 in which there are means for yieldingly urging the balls to wedging position.

13. A device comprising a sleeve member and a rod member within the sleeve member, one of said members having on its surface a plurality of endless grooves each having a helical portion of determinate pitch and a reverse portion connecting the beginning and end of the helical portion, the other member having on its surface facing the first member a helical groove of said determinate pitch extending along the operating length of the second member, a plurality of series of balls each series interposed between and bearing on the surfaces of one of said endless grooves and on said helical groove, said helical groove being concave on a radius substantially that of the balls, and the endless grooves each having a wedging face inclined toward the axis of the members between which face and the concave surface of the helical groove the balls wedge and prevent axial movement between the sleeve and the rod in one direction and cause relative axial movement between the members in the other direction as the wedged balls travel in the helically disposed grooves in response to relative rotation between the members, the balls being freed of said wedging action during passage through the reverse portions of said endless grooves.

14. The invention as defined in claim 13 in which the rod member has the helical groove.

15. The invention as defined in claim 13 in which the sleeve member has the helical groove.

16. The invention as defined in claim 13 in which there is means for yieldingly urging the balls to wedging position.

17. The invention as defined in claim 13 in which there is means for yieldingly urging the balls to wedging position, and means for releasing the balls from wedging position as they pass through said reverse portion of the endless groove.

18. The invention as defined in claim 13 in which the helical groove is of multi-lead form.

19. The invention as defined in claim 13 in which the helical grooves are shallow forming low ridges between the convolution thereof and portions of the faces of the endless grooves are spaced from the ridges sufficiently to allow the balls to move from one to another convolution of the helical groove over said ridges when moved into said spaced portions of the faces of the endless grooves.

20. The invention as defined in claim 19 in which there is means for moving all of said balls into said spaced portions to permit retrograde axial movement of the sleeve and rod when desired without relatively rotating the members.

21. The invention as defined in claim 1 in which there are means for yieldingly urging the balls to wedging position.

22. A vise comprising a frame having a fixed jaw and a movable jaw, said fixed jaw having a sleeve on the internal surface of which is a plurality of endless grooves each having a helical portion of determinate pitch and a reverse portion connecting the beginning and end of the helical portion, the movable jaw having a rod within the sleeve on the external surface of which there is a shallow helical groove of said determinate pitch extending along the operating length of the rod, a plurality of series of balls each series interposed between and bearing on the surfaces of one of said endless grooves and on said helical groove, said helical groove being concave on a radius substantially that of the balls, and the endless grooves each having a wedging face inclined toward the axis of the sleeve between which face and the concave surface of the helical groove the balls wedge and prevent axial movement of the rod in jaw-opening direction and cause axial movement of the rod in jaw-closing direction as the wedged balls travel in the helically disposed grooves in response to relative rotation between the members, means for yieldingly urging the balls to wedging position, the balls being freed of said wedging action during their passage respectively through the reverse portions of said endless grooves, the helical groove being shallow and forming low ridges between the convolutions thereof, and portions of the faces of the endless grooves being spaced from the ridges sufficiently to allow the balls to move from one to another convolution of the helical groove over said ridges when moved into said spaced portions of the faces of the endless grooves by axial movement of the rod in jaw-closing direction without rotation to quickly bring the movable jaw against the work, and manually operable means for moving all of said balls into said spaced portions to permit axial movement of the rod to open the jaws without the necessity of rotating the rod.

References Cited in the file of this patent

UNITED STATES PATENTS

| | | |
|---|---|---|
| 2,214,493 | Trbojevich | Sept. 10, 1940 |
| 2,472,002 | Clark | May 31, 1949 |